No. 728,388. Patented May 19, 1903.

UNITED STATES PATENT OFFICE.

EMILE A. FOURNEAUX, OF NEW YORK, N. Y., ASSIGNOR TO HERMAN A. METZ, OF BROOKLYN, NEW YORK.

AZO DYE AND PROCESS OF MAKING SAME.

SPECIFICATION forming part of Letters Patent No. 728,388, dated May 19, 1903.

Application filed September 16, 1902. Serial No. 123,558. (No specimens.)

*To all whom it may concern:*

Be it known that I, EMILE A. FOURNEAUX, a citizen of the United States, residing in New York, borough of Manhattan, in the State of New York, have invented certain new and useful Improvements in Azo Dyes Suitable for the Manufacture of Red Lake and Pigment Colors and Process of Making the Same, of which the following is a specification.

The so-called "para-nitranilin red," para-nitrobenzol-azo-beta-naphthol, is used in the manufacture of red lake and pigment colors; but being insoluble it cannot be used as such in the finished state like other azo colors, but must be produced in the process of lake-making itself by coupling diazotized para-nitranilin with an alkaline beta-naphthol solution in the presence of a suitable base. Diazotizing and coupling are rather delicate operations which cannot be performed to the best advantage under these conditions. Consequently this process is far from satisfactory and is uncertain in its results. If it were possible to put this dye, para-nitrobenzol-azo-beta-naphthol, in such a form that it could be employed as such in the manufacture of lakes like any of the soluble azo colors, it would constitute a great improvement in the art of lake-making. I have succeeded in preparing a product consisting, mainly and essentially, of para-nitrobenzol-azo-beta-naphthol which not only fulfils that condition, but also produces lakes possessing a far more desirable and bluer cast of shade than those obtained from diazotized para-nitranilin and beta-naphthol and great fastness to light. Such a product can be obtained, for instance, by mixing solutions of equimolecular amounts of the dye from diazotized sulfanilic acid and beta-naphthol and para-nitrodiazo-benzol and allowing these compounds to react on each other. The reaction will take place in the main as follows: The para-nitrodiazobenzol will combine with the beta-naphthol, eliminating the diazobenzolsulfonic acid and forming para-nitrobenzol-azo-beta-naphthol, which under these conditions appears in a form very materially different from that in which it is obtained by the direct copulation of para-nitrodiazobenzol with beta-naphthol. In this new form the dye appears as a thin gelatinous paste, which is insoluble in water, but so extremely finely divided that it reacts readily with metallic salts, just as if it were soluble. A similar product can also be obtained by mixing solutions of equimolecular amounts of para-nitrodiazobenzol and other diazo compounds—for instance, para-diazobenzolsulfonic acid—and allowing the mixture to run into an alkaline beta-naphthol solution. The products obtained by these methods are purified by adding common salt, which facilitates the filtering, and then washing the filtered product with a diluted salt solution. The product is then reduced to paste form, in which form it is applied for the manufacture of lakes.

It is obvious that the sulfanilic acid can be replaced by other similar compounds, which play only a secondary part in this process, and that other nitrodiazo compounds can be used instead of the para-nitrodiazobenzol.

Having thus described my invention, I claim as new and desire to secure by Letters Patent—

1. The process herein described of making an azo dye suitable for the manufacture of red lake and pigment colors, which consists in mixing solutions of equimolecular amounts of a diazo compound, a nitrodiazo compound, and an alkaline beta-naphthol solution, substantially as set forth.

2. An azo dye suitable for the manufacture of red lake and pigment colors, consisting essentially of para-nitrobenzol-azo-beta-naphthol, and being a thin gelatinous paste, which is insoluble in water, but so finely divided as to react readily with metallic salts and producing red lakes of a bluish shade, having great fastness to light, substantially as set forth.

In testimony that I claim the foregoing as my invention I have signed my name in presence of two subscribing witnesses.

EMILE A. FOURNEAUX.

Witnesses:
HENRY J. SUHRBIER,
JOSEPH H. NILES.